United States Patent [19]

Barnhart

[11] Patent Number: 4,784,053
[45] Date of Patent: Nov. 15, 1988

[54] FOOD PRODUCT COOKER

[75] Inventor: Everett E. Barnhart, Raytown, Mo.

[73] Assignee: Meyer Metalcraft Specialties, Inc., Windsor, Mo.

[21] Appl. No.: 13,681

[22] Filed: Feb. 11, 1987

[51] Int. Cl.⁴ .................... A47J 37/08; A23L 3/02
[52] U.S. Cl. ................... 99/443 C; 99/386; 99/470; 426/407; 426/510
[58] Field of Search ........... 426/407, 510, 511, 523, 426/524; 99/470, 339, 386, 443 C; 126/20, 41 C

[56] References Cited

U.S. PATENT DOCUMENTS

| | | | |
|---|---|---|---|
| 925,605 | 6/1909 | Solliday | 62/375 |
| 1,468,050 | 9/1923 | Taylor | 62/63 |
| 1,550,946 | 8/1925 | Braungart, Jr. et al. | 62/375 |
| 1,898,758 | 2/1933 | Bottoms | 62/63 |
| 1,992,398 | 2/1935 | Ryder | 426/511 |
| 3,073,236 | 1/1963 | Blaschek et al. | 99/470 |
| 3,092,125 | 6/1963 | Kinsey | 62/374 |
| 3,173,276 | 3/1965 | Martin | 62/380 |
| 3,315,489 | 4/1967 | Zebarth et al. | 62/266 |
| 3,405,531 | 10/1968 | Davis, Jr. et al. | 62/63 |
| 3,644,129 | 2/1972 | Sloan | 426/524 |
| 3,689,282 | 9/1972 | Feinberg | 426/524 |
| 3,812,274 | 5/1974 | Weaver et al. | 426/524 |
| 3,844,135 | 10/1974 | Zamiara | 62/375 |
| 3,882,686 | 5/1975 | Rose | 62/63 |
| 3,889,009 | 6/1975 | Lipoma | 99/443 C |
| 4,042,717 | 8/1977 | Gayte | 426/524 |
| 4,121,509 | 10/1978 | Baker et al. | 99/443 C |
| 4,138,860 | 2/1979 | Drummond | 62/375 |
| 4,277,954 | 7/1981 | Drummond | 62/375 |
| 4,329,850 | 5/1982 | Drummond | 62/63 |
| 4,336,274 | 6/1982 | Ross et al. | 426/524 |
| 4,664,923 | 5/1987 | Wagner et al. | 426/233 |

Primary Examiner—George Yeung
Attorney, Agent, or Firm—Litman, McMahon & Brown

[57] ABSTRACT

A food product cooker comprises a first relatively low temperature above ambient heating compartment, a second relatively high temperature heating compartment, a third water rinsing and cooling compartment and a fourth chiller compartment. The food product is conveyed through the first, second and third compartments on a serpentine conveyor having a plurality of vertical flights. Steam is introduced into the first and second compartments beneath the conveyor and removed by a venting system from the top of the compartments in such a manner as to maintain a generally constant and uniform heating temperature throughout the respective compartments.

5 Claims, 3 Drawing Sheets

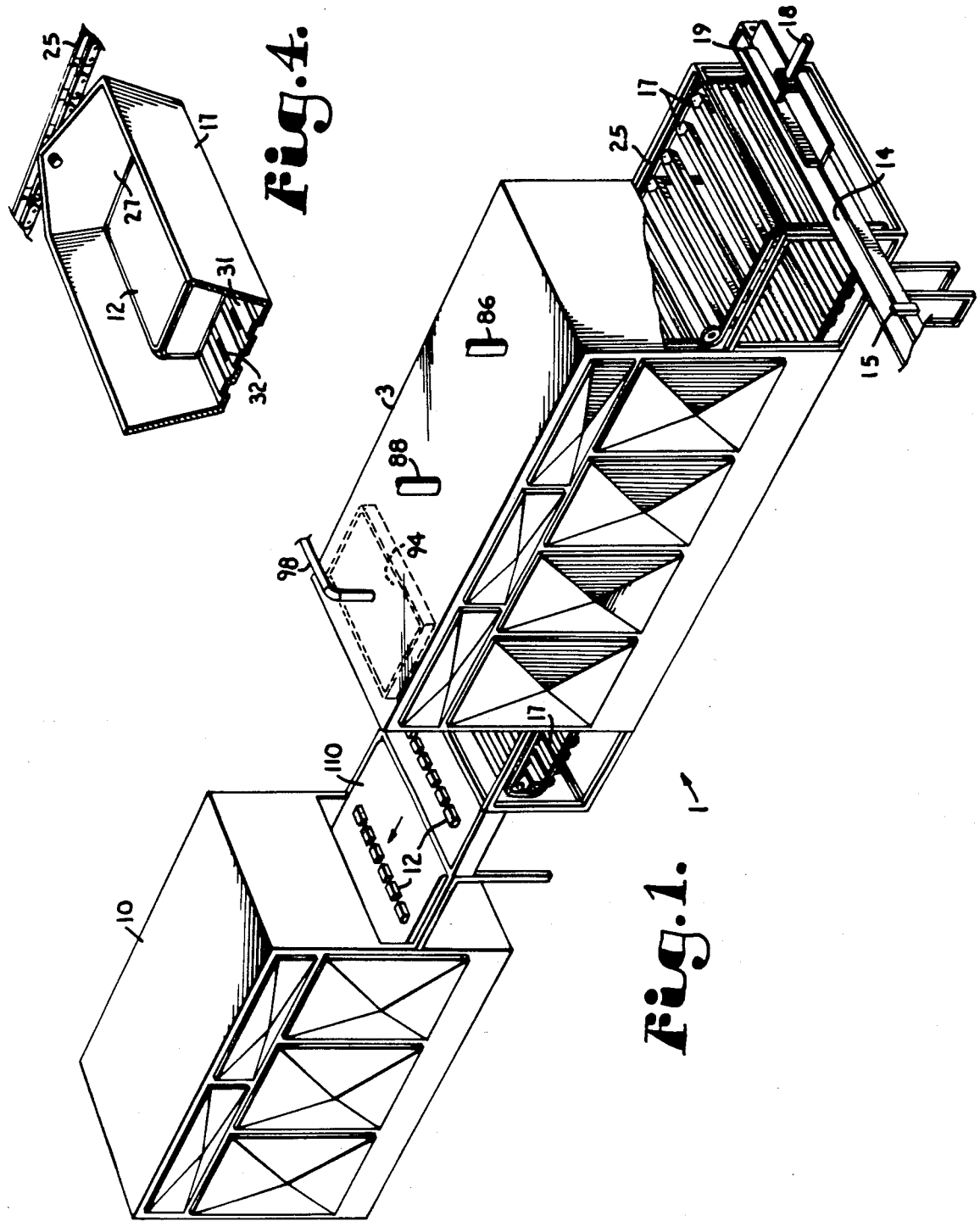

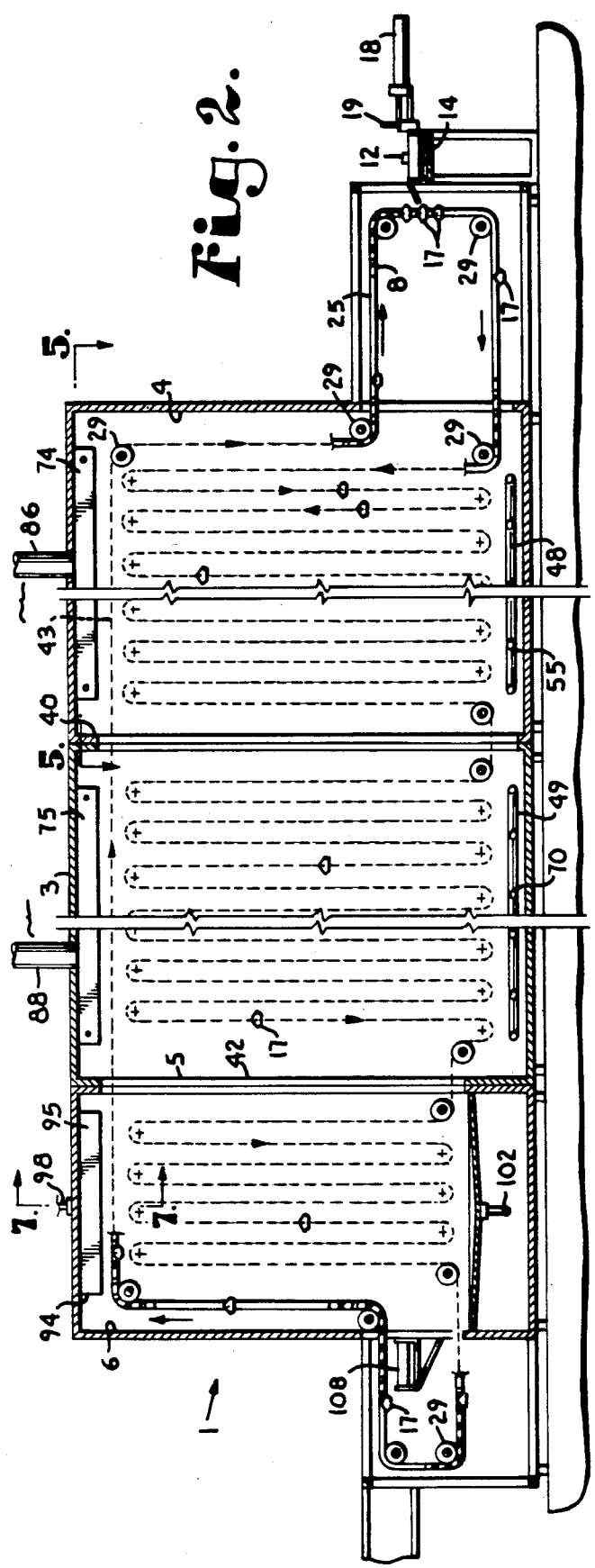
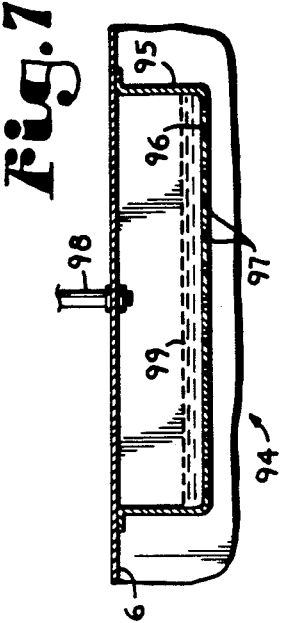
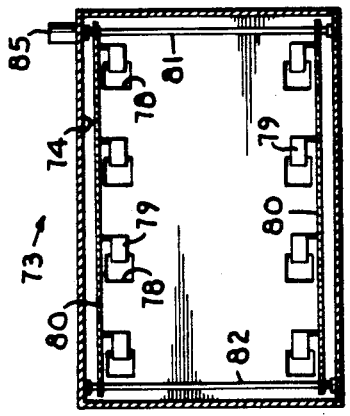

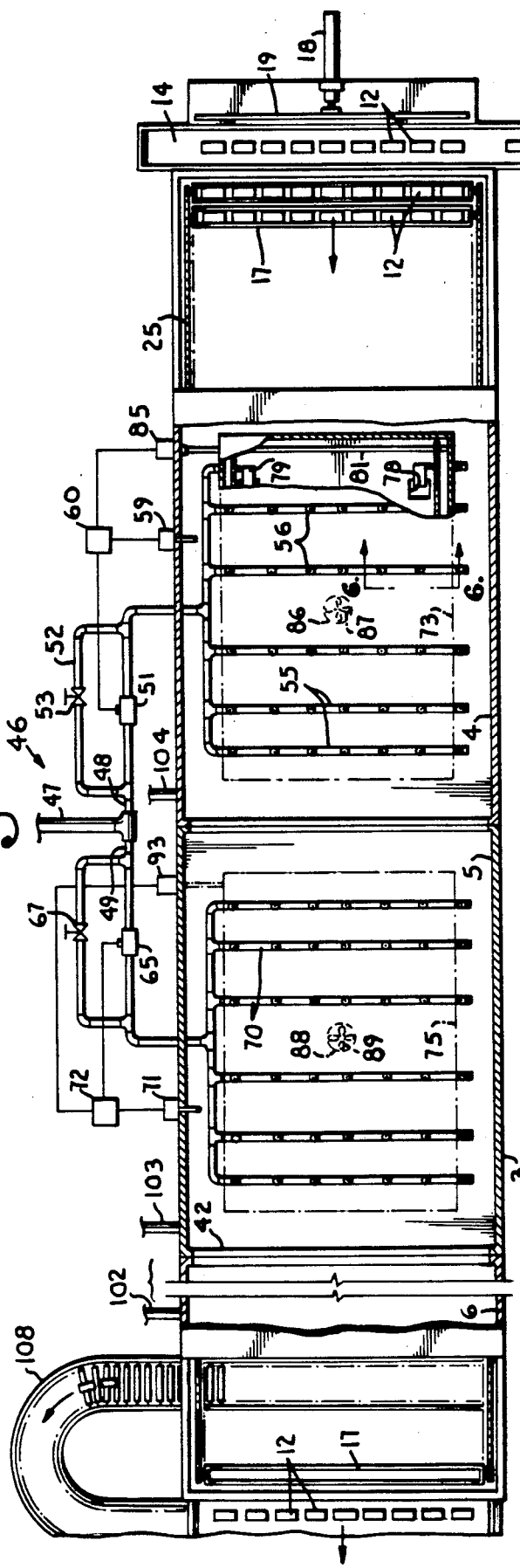
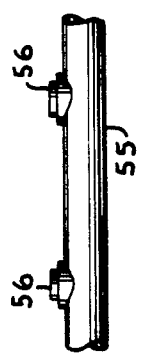
Fig. 3.
Fig. 6.

FOOD PRODUCT COOKER

BACKGROUND OF THE INVENTION

The present invention is directed to a food product cooker and, in particular, to a cooker wherein the food is conveyed through a series of different temperature chambers.

In mass production of certain preprepared foods, the food is first placed in a pouch of plastic or the like which is then sealed. Fairly uniform quantities of the product are placed in each of the pouches. The pouches are then heated so as to cook the food and thereafter cooled to preserve the food and maintain quality of the food during storage and transportation.

In certain products of this type, it is very important to raise the temperature of the products slowly and to apply a high temperature to the product which is free from severe cycling and has no high temperature spikes. In particular, if the product is heated too quickly or if high temperatures are unevenly applied to the product, especially where the product is a meat product, the organoleptic qualities of the resultant product will be low, principally because the quick exposure to heat and the cycling of high temperatures both tend to drive fluids, especially water and fats, from the product.

Certain of the prior art devices have utilized steam for cooking; however, the steam has been inserted near the top of the cooker or indiscriminately, which has resulted in uneven temperature gradations across the cooker and especially in high temperature spikes near the top of the cooker. These uneven high temperatures of the prior art cause the resultant poor quality in the final product which was referred to in the previous paragraph. Therefore, it is important to introduce the steam for cooking in a highly controlled and even manner, such that the temperature remains substantially isothermal throughout a particular cooking region.

OBJECTS OF THE INVENTION

Therefore, the objects of the present invention are: to provide a food product cooker having multiple processing chambers with each chamber operating at a substantially different temperature than the previous chamber; to provide such a cooker having an initial heating chamber at a relatively low temperature relative to a subsequent chamber; to provide such a cooker having a steam distribution system to provide uniform temperature throughout a cooking region or compartment; to provide such a cooker having a control mechanism for maintaining a substantially even and constant temperature throughout a particular cooking chamber; to provide a method of cooking a food product wherein the product is exposed to various cooking temperatures; to provide such a method wherein the food is conveyed first through a lower temperature cooking chamber of substantially constant temperature and thereafter conveyed into a higher temperature cooking chamber of substantially constant temperature; to provide such a method including exposing the food product after cooking to a cooling liquid rinse and thereafter placing the product in a refrigeration system so as to substantially chill the product; and to provide such a cooker which is relatively easy to manufacture and operate and which is especially well adapted for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a food product cooker in accordance with the present invention.

FIG. 2 is a fragmentary and enlarged side cross-sectional view of the cooker.

FIG. 3 is a fragmentary and enlarged top plan view of the cooker with portions removed to show detail thereof.

FIG. 4 is a fragmentary and enlarged perspective view of a pan utilized in the cooker.

FIG. 5 is an enlarged cross-sectional view of a steam exhaust dampener system of the cooker, taken along line 5—5 of FIG. 2.

FIG. 6 is an ;enlarged and fragmentary side elevational view of a steam distribution tube and nozzles of the cooker, taken along line 6—6 of FIG. 3.

FIG. 7 is an enlarged and fragmentary cross-sectional view of a water dispersion system of the cooker, taken along line 7—7 of FIG. 2.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Shown in the figures is a food product cooker, in accordance with the present invention, generally designated by the reference numeral 1.

The cooker 1 comprises an enclosure 3 having a first region or compartment 4, a second region or compartment 5 and a third region or compartment 6 through which serpentine conveyor 8 passes and further includes a chiller 10.

During operation, a food product such as meat packaged in individual sealed containers or packages 12, such as plastic or the like, are conveyed to the cooker 1, passed through the cooker 1 in a manner described below and eventually stored after passing through the chiller 10.

The food packages 12 are conveyed to the cooker 1 on a conveyor 14 from food processing and packaging stations which are not shown. The packages 12 pass along the conveyor 14 and are counted by a counter 15 until a predetermined number of packages 12 are accumulated near the end of the conveyor 14. The packages 12 are accumulated in such a manner as to align with trays 17 which are associated with the serpentine conveyor 8 of the cooker 1. When a tray 17 is properly positioned for receiving food packages 12 from the conveyor 14, a ram 18 with a package engaging front pusher panel 19 is activated so as to push the packages 12 toward and into the aligned tray 17. The packages 12 then rest in the bottom of the tray 17, such as is shown in FIG. 4. The timing of the triggering of the ram 18 may be manually controlled or preferably is automatically controlled by use of position sensors and a controller tied to the counter 15.

The serpentine conveyor 8 comprises a pair of tray carrying chains 25 which are equally spaced on opposite sides of the tray 17 and which follow a predetermined position or track through the cooker 1, as can be seen in FIG. 2. Each of the trays 17 are pivotally connected near the tops of opposite ends 27 thereof to the chains 25. The chains 25 follow a series of guidance or directing gears 29 at least one of such gears being motor driven at a generally constant speed so as to drive the chains 25 and, consequently, the trays 17 along the path of the conveyor 8. The trays 17 are open top and have a lower ribbed surface 31 which has drainage openings 32 therein.

The first compartment 4 comprises a chamber having openings in opposite walls thereof to allow the serpentine conveyor 8 to pass therethrough. Eighteen flights of the conveyor 8 pass from between near the top and bottom of the first compartment 4 such that the flights are generally vertically aligned and approximately equally spaced.

Located in the second compartment 5 are also approximately eighteen vertically aligned flights of the conveyor 8 which pass from near the bottom to near the top of the second compartment 5.

Located in the third compartment 6 are approximately eight vertically aligned flights of the conveyor 8. The conveyor 8 is configured such that the trays 17 pass first through the vertical flights of the first compartment 4, then through a wall 41 separating the first compartment 4 from the second compartment 5 and having an opening therein large enough for the conveyor 8 to pass therethrough. The trays 17 then pass through the vertically aligned flights of the second compartment and through a wall 42 separating the second compartment 5 from the third compartment 6. The trays then pass through the vertical flights in the third compartment 6 and thereafter return to the first compartment 4 along a single generally horizontally aligned overhead run 43. The number of flights are variable according to product and value.

A heating manifold and in particular a steam dispensing manifold 46 is cooperatively positioned with respect to the first compartment 4 and second compartment 5 so as to disperse steam in a controlled manner thereinto. In particular, the steam manifold 46 includes a main header 47 which diverges outside of the enclosure 3 into a pair of steam conduits 48 and 49. The conduit 48 has associated therewith an automatic control valve 51 with a bypass line 52 going around the control valve 51 and with a manual valve 53 in the bypass line 52. The conduit 49 enters the first compartment 4 near the lower end thereof and diverges into a series of generally horizontally aligned and parallel distribution tubes 55 each having a series of steam dispersing nozzles 56 spaced generally equally therealong. For the illustrated cooker 1, each of the tubes 55 has approximately nine nozzles 56. The tubes 55 and nozzles 56 are so positioned such that steam is fairly uniformly dispersed from the conduit 48 over the entire lower portion of the first compartment 4.

A temperature sensing probe 59 is positioned in the side of the first compartment 4 and is operably connected to a controller 60. The controller 60 in turn is operably connected to the automatic control valve 51 in such a manner as to allow opening or closing of the valve 51 in response to a differential temperature as sensed by the probe 59 in comparison to a pre-selected set point temperature.

The conduit 49 supplies steam to the second compartment 5 in a manner similar to the supply of steam to the first compartment 4 by the conduit 48. In particular, the conduit 49 has an automatic control valve 65 positioned so as to control flow through the main channel of the conduit 49 and a bypass 66 having a hand controlled valve 67 therein which allows passage of steam around the control valve 65. The conduit 49 enters through the wall of the second compartment 5 and diverges into a series of steam distribution tubes 70. Each of the tubes 70 is positioned near the bottom of the second compartment 5 in a horizontal and generally parallel spaced relationship. The tubes 70 each have a plurality of distribution nozzles thereon similar to the distribution nozzles 56. The distribution nozzles associated with the conduit 49 are generally uniformly spaced throughout the bottom of the second compartment 5 so as to provide a general flow of steam into the bottom of the second compartment 5 which is substantially uniform across the bottom.

A ducting mechanism 73 is provided at the tops of the first compartment 4 and second compartment 5. The ducting mechanism 73 comprises a pair of plenums 74 and 75. The plenum 74 is associated with the first compartment 4 and is positioned near the top thereof. The plenum 74, see FIG. 5, includes a plurality of openings 78 which allow communication between an interior of the plenum and the interior of a remainder of the first compartment 4.

The openings 78 are coverable so as to prevent direct communication or gaseous flow between the interior of the compartment 4 and the plenum 74 by an equal number of damper plates 79 which are attached to a drive chain 80. The drive chain 80 is rotatably mounted on a pair of opposed axles 81 and 82 having suitably positioned chain engaging gears which allow rotation of the chain and consequent reciprocating motion of the damper plates 79 in response to rotation of the axle 81, so as to cover or uncover the openings 78. The axle 81 is in turn connected to a drive motor 85 which in turn is connected to the controller 60. The drive motor 85 may be manually operated so as to open or close the damper plates 79 relative to the openings 78 or such control may be accomplished automatically by use of the controller 60.

Communicating with the interior of the plenum 74 is a vent 86 having a vent fan 87 therein. The fan 87 may also be controlled manually or automatically through the controller 60. When the openings 78 are not covered by the damper plates 79, the fan 87 draws gases, including steam from the first compartment 4 through the plenum 74 and out the vent 86 to exhaust into the ambient atmosphere.

The plenum 75 is configured similar to the plenum 74 and includes a plurality of openings and damper plates as has been described for the plenum 74. The plenum 75 also includes a vent 88 with a fan 89 positioned therein such that when the openings of the plenum 74 are uncovered by the damper plates associated therewith, gaseous fluids, including steam, are drawn from the second compartment 5 through the plenum 75 and exhausted through the vent 88. The position of the damper plates of the plenum 74 is controlled by a motor 93 which is connected to the controller 72. In this manner, the controller 72 can be utilized to open and close the dampers associated with the plenum 75 so as to control flow of steam exhausted thereby or open and close the valve 65 so as to control the amount of steam entering the second compartment 5.

The third compartment 6 includes a water washing and cooling system 94 which is located in the upper portion thereof. The water system 94 includes a generally rectangular pan 95 attached to the top of the third compartment 6, see FIG. 7. The pan 95 has a bottom wall 96 with a plurality of sieve-like apertures 97 therein. A water supply line 98 supplies water 99 to the interior of the pan 95 so that it is fairly evenly distributed upon the bottom 96. The water then passes through the apertures 97 so as to drip or rain fairly evenly over the trays 17 being carried by the conveyor 8 through the third compartment 6. In this manner, the packages 12 on the conveyor 8 are cooled and washed during passage through the third compartment 6.

After passing over the trays 17 in the third compartment 6, the water is collected near the bottom of the third compartment 6 and directed to a drain 102. Similar drains 103 and 104 are provided for condensation which collects in the bottom of the first compartment 4 and second compartment 5 respectively.

After being rinsed and cooled in the third compartment 6, the packages 12 are transferred to a conveyor 108 by turning the trays 17 sideways so as to allow the packages 12 to fall onto the conveyor 108. The conveyor 108 transfers the packages to the front of the chiller 10 where a conveyor 110, utilizing trays similar to the previously described trays 17, transfers the packages 12 through the chiller 10. Subsequent to exiting the chiller 10, the packages 12 are ready for storage or shipment and are manually or automatically unloaded from the chiller 10.

In use, the cooker 1 is designed to uniformly cook a large quantity of prepackaged foods, especially meats, in a highly controlled environment. The packages 12 are placed on the conveyor 8 near the entrance to the first compartment 4 by automatic operation of the ram 18. The packages 12 then pass through the cooker 1 following the route of the conveyor 8.

Generally, the temperature within the first compartment 4 and second compartment 5 will be closely regulated. Also generally, the first compartment 4 will be at a substantially lower temperature than the second compartment, but above ambient, so as to raise the temperature of the food product slowly to prevent damage caused by exposure to sudden high temperatures or to high temperature spikes. As used herein, ambient temperature is the temperature of the area outside the cooker 1 which is normally about 70° F. It has been found for meat products that a temperature of 135° F. in the first stage or first compartment 4 is advantageous while a temperature of 165° F. works well for the second stage or compartment 5. The temperature of the first compartment is controlled by the temperature sensor 59 operating through the controller 60 and the automatic control valve 51. The temperature may also be somewhat regulated by the amount of steam drawn from the chamber 4 through the vent 86 which is in turn controlled by the position of the damper plates 79. Because the openings 78 are positioned fairly evenly about the top of the compartment 4 and because the damper plates 79 are positioned so as to allow passage of gas through a generally equal cross-section of each of the openings 78, gas and, in particular, steam is withdrawn from the first compartment 4 in a generally uniform manner.

The flow of steam through the first compartment 4 and the agitation or circulation caused by the steam passing through the compartment 4 as it is drawn by the fan 87, allows a fairly uniform and constant temperature to be maintained throughout the interior of the first compartment 4. It is believed that the injection of the steam in a rather uniform manner near the bottom of the compartment 4 also aides in providing a rather uniform and continuous temperature throughout the first compartment 4.

The interior temperature of the second compartment 5 is controlled much as was described for the first compartment 4. In particular, steam is injected into the bottom of the compartment 5 through the distribution conduit 49 as controlled by the valve 65 which is in turn controlled by the controller 72 which in turn receives a temperature input from the sensor 71. The controller 72 may also modify the position of the damper plates associated with the plenum 75 so as to control the amount of gaseous flow through the plenum which is drawn by the fan 89. This system allows a substantially even and constant control of the temperature throughout substantially the entire compartment 5 at a temperature substantially greater than the temperature in compartment 4.

After passing through the second compartment 5, the food product packages 12 pass through the third compartment and are cooled and washed by water at about ambient temperature by the system 94; thereafter the packages are offloaded onto the conveyor 108 and transferred to the chiller 10 for final cooling to a temperature substantially below ambient which may be below 32° F. if it is desired to freeze the product. After passage through the chiller 10, the packages 12 are unloaded and stored or shipped.

It is to be understood that while certain forms of the present invention have been illustrated and described herein, it is not to be limited to the specific forms or arrangement of parts described and shown.

What is claimed and desired to be secured by Letters Patent is as follows:

1. In a food product cooker having an enclosure and a conveyor for transporting the food product through the enclosure; the improvement comprising wherein:
 (a) said enclosure includes separate first and second vertically extending compartments; said conveyor having a vertical component of movement during at least a portion of the time a tray of said conveyor adapted to hold the food product passes through each of said first and second compartments; and including:
 (b) heating means for supplying heat to each of said compartments; said heating means comprises a steam distribution system located in a lower portion of each of said first and second compartments; and said heating means generally uniformly introducing steam into the bottom of each of said first and second compartments;
 (c) a ventilation system located near the top of said first and second compartments for selectively drawing gases from said first and second compartments to maintain generally uniform temperatures through said first and second compartments respectively; and (d) heat sensor means associated with said first and second compartments, cooperating with said ventilation system and operably controlling steam to said distribution system so as to maintain generally constant temperatures in said first and second compartments respectively;

(e) control means for controlling the heat to each compartment such that each of said compartments is at a substantially different heating temperature and such that said first compartment is at a temperature above ambient and substantially below the temperature of said second compartment.

2. The cooker according to claim 1 including:

(a) a third compartment; said conveyor transporting said product into said third compartment subsequent to said second compartment; and including:

(b) washing and cooling means for reducing the temperature of said product below the temperature of said second compartment.

3. The cooker according to claim 2 including:

(a) a chiller positioned to receive said product from said third compartment and chilling said product substantially below ambient temperature.

4. In a food product cooker having an enclosure with a cooking compartment and a serpentine conveyor for transporting the product through said enclosure wherein heating is provided for by the introduction of steam into said enclosure; the improvement comprising:

(a) said compartment extending vertically and said conveyor having a path through said compartment that at least partially includes a vertically component of travel;

(b) distribution means for said steam located in a lower portion of said compartment beneath the product conveyor;

(c) ventilation means located near an upper portion of said compartment above said product conveyor and adapted to draw steam from said distribution means through said compartment; and (d) control means associated with said distribution means and cooperating with said ventilation means to control the temperature in said compartment by control of steam into said compartment such that the temperature in said enclosure is vertically substantially constant and uniform throughout said compartment.

5. The cooker according to claim 4 wherein:

(a) said enclosure comprises two separate compartments; and (b) said control means maintains the temperature in each compartment generally uniform and constant across a respective compartment, but wherein each of said compartments is controlled at a substantially different temperature above ambient.

* * * * *